W. R. JEFFREYS.
APPARATUS FOR DRYING BARRELS AND OTHER RECEPTACLES.
APPLICATION FILED NOV. 17, 1915.
1,195,024.
Patented Aug. 15, 1916.
4 SHEETS—SHEET 1.
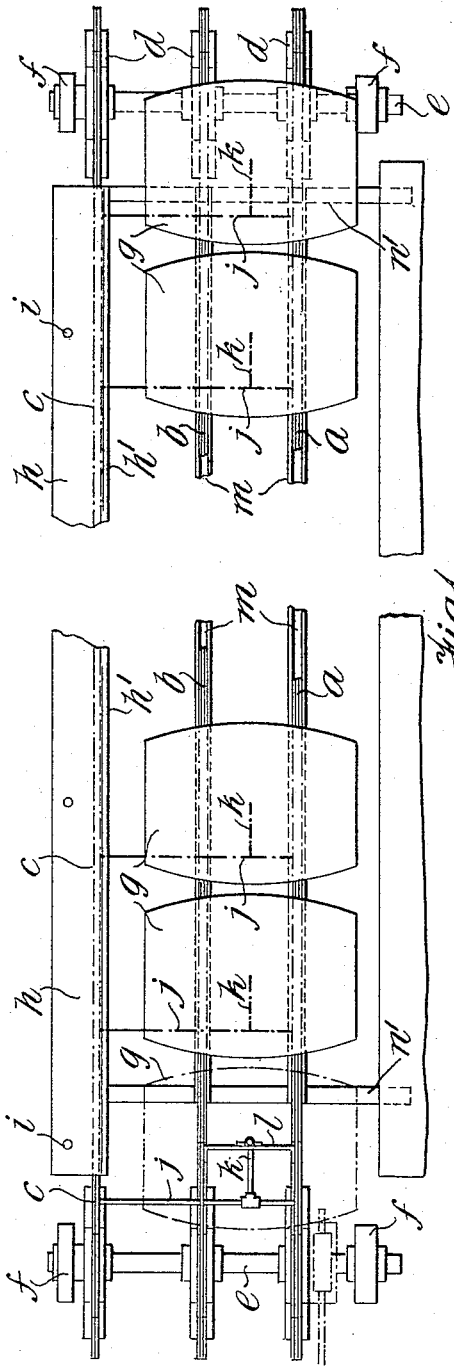
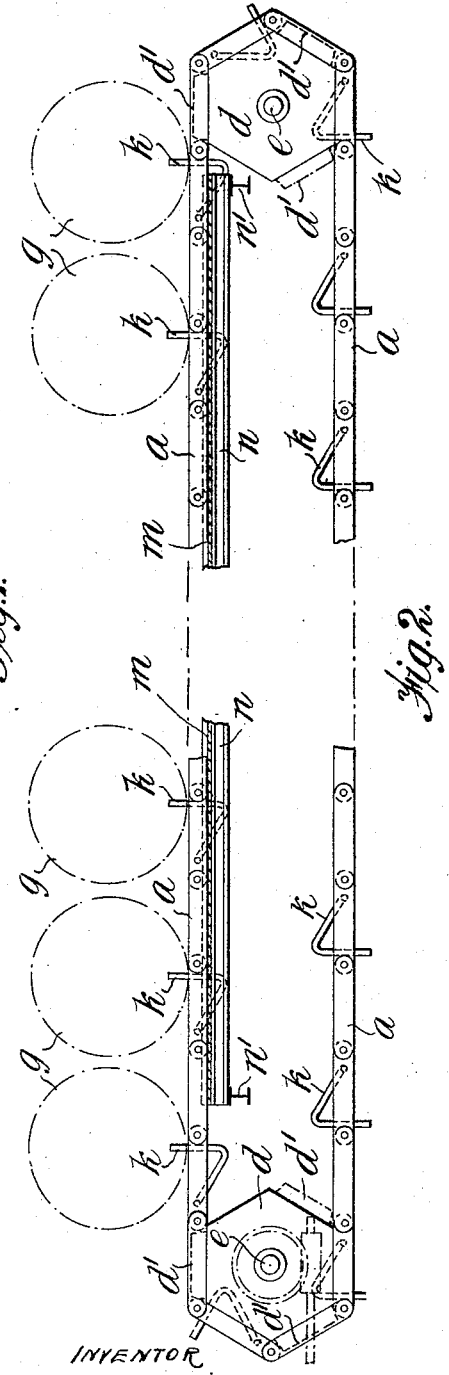
WITNESS
INVENTOR
WILLIAM ROBERT JEFFREYS
By
Attorney

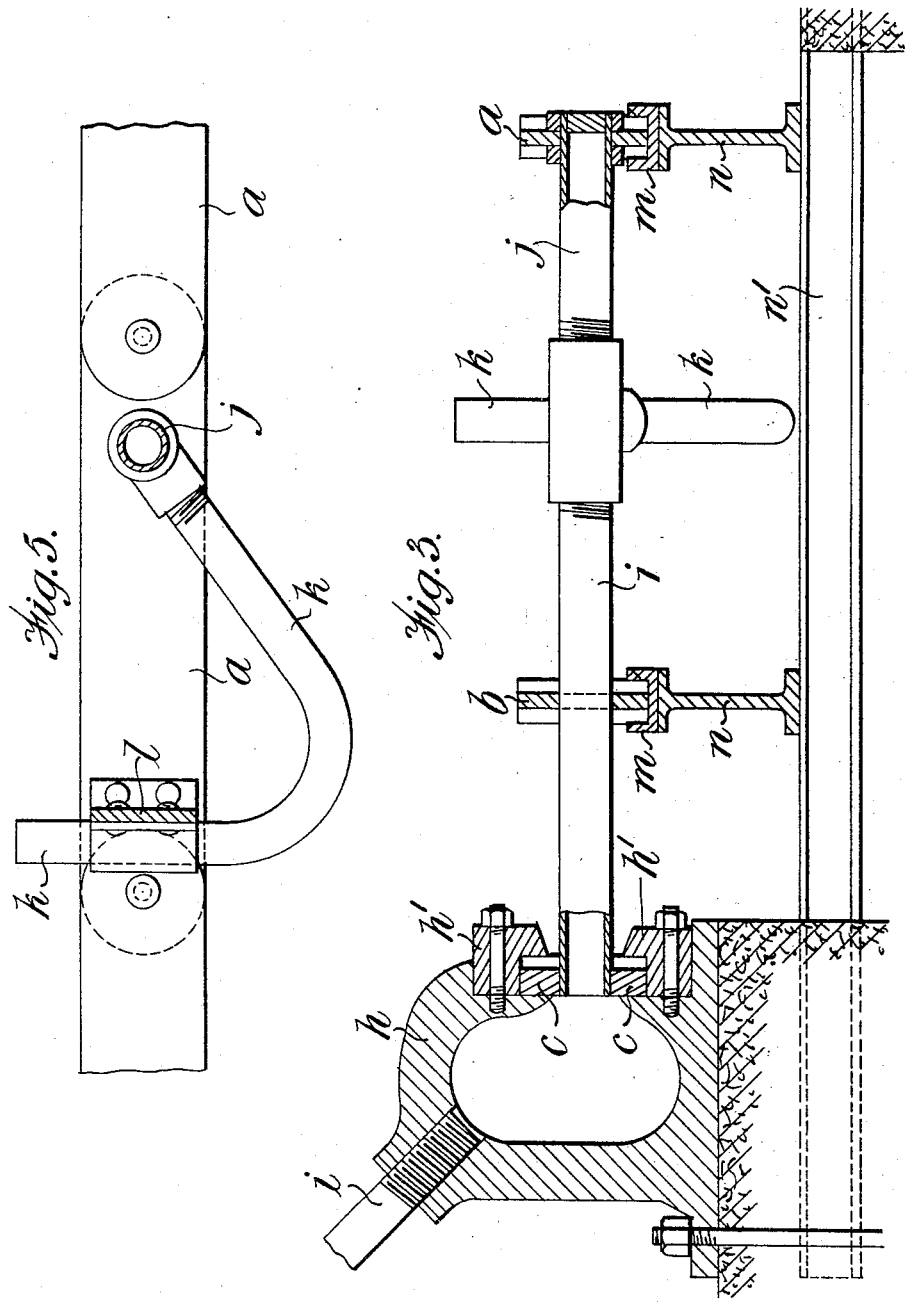

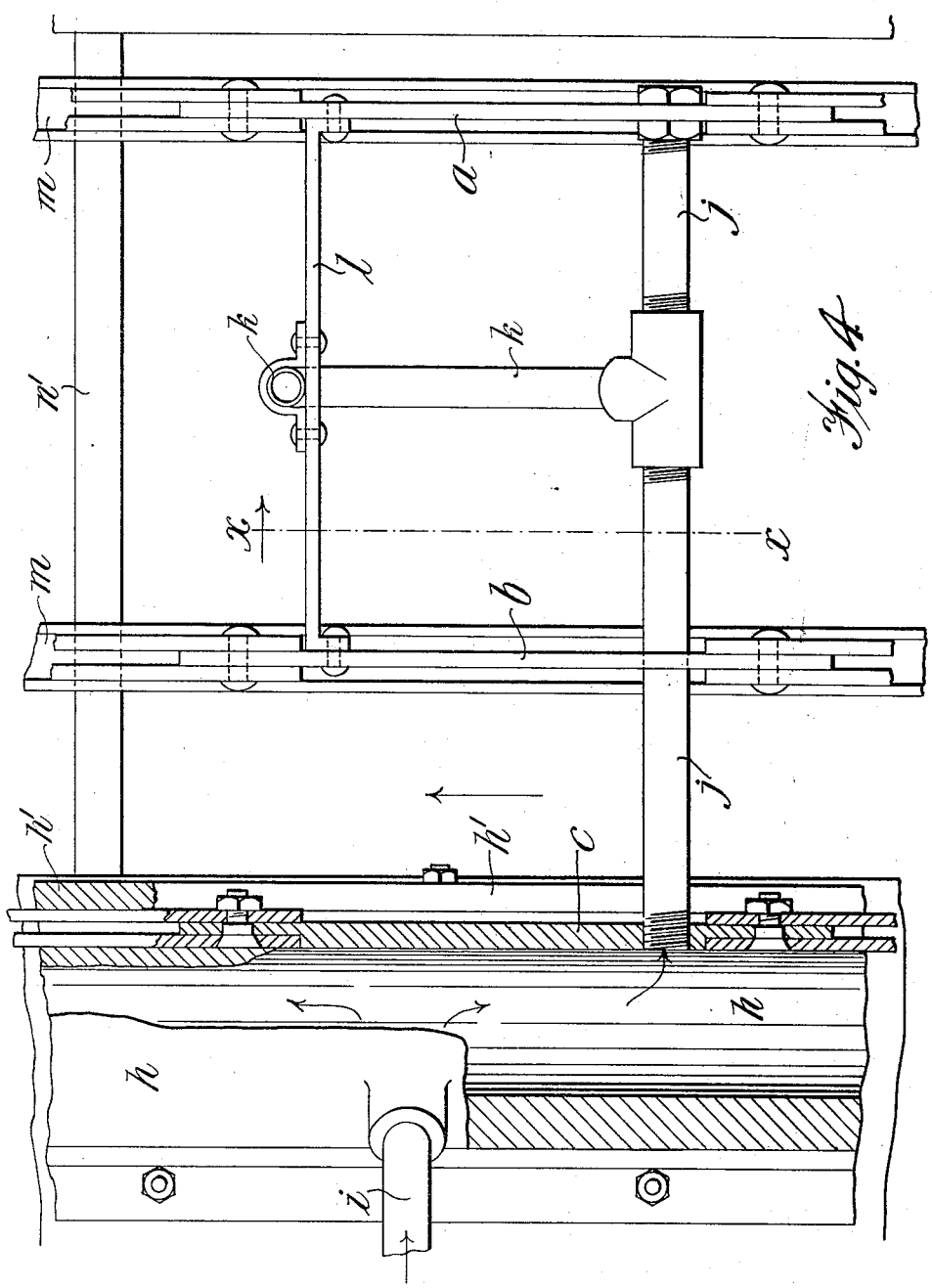

W. R. JEFFREYS.
APPARATUS FOR DRYING BARRELS AND OTHER RECEPTACLES.
APPLICATION FILED NOV. 17, 1915.
1,195,024.
Patented Aug. 15, 1916.
4 SHEETS—SHEET 4.
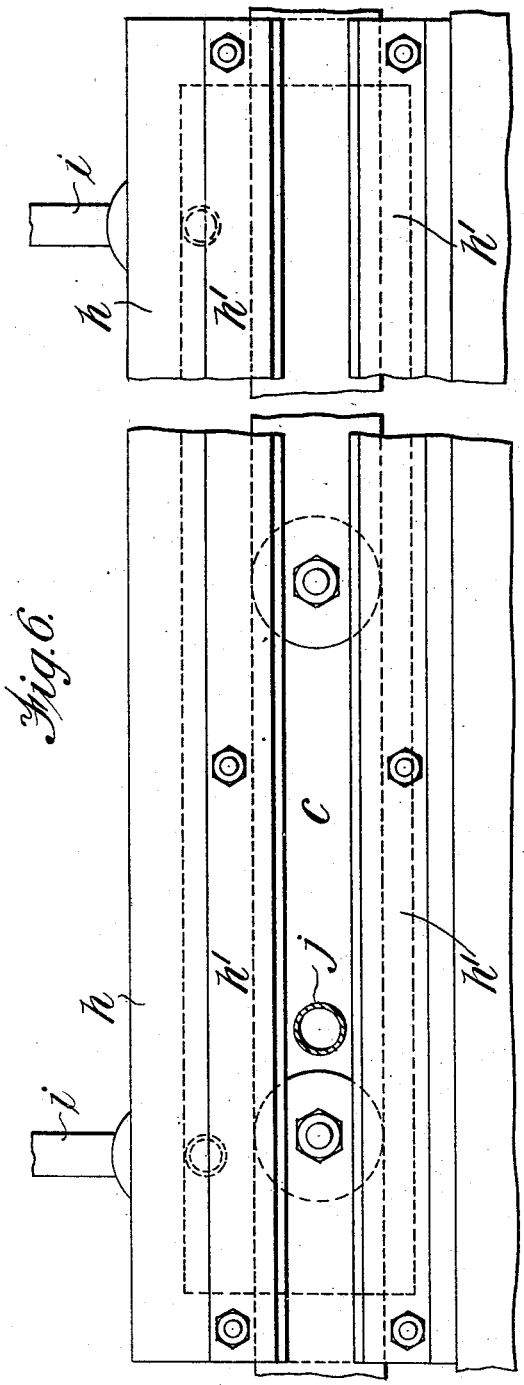

UNITED STATES PATENT OFFICE.

WILLIAM ROBERT JEFFREYS, OF GRANGEMOUTH, SCOTLAND.

APPARATUS FOR DRYING BARRELS AND OTHER RECEPTACLES.

1,195,024.  Specification of Letters Patent.  Patented Aug. 15, 1916.

Application filed November 17, 1915. Serial No. 62,057.

*To all whom it may concern:*

Be it known that I, WILLIAM ROBERT JEFFREYS, a subject of the King of Great Britain, residing at 95 Bo'ness road, Grangemouth, Scotland, have invented certain new and useful Apparatus for Drying Barrels and other Receptacles, of which the following is a specification.

In the method of steaming and drying barrels heretofore employed, it has been the practice to place the barrel over a fixed pipe passed through the bung hole and by this means steam or air has been injected into the said barrel, the steam or air passing through the aforesaid pipe under pressure.

According to the present invention, an apparatus is provided whereby the pipes, instead of being fixed, are movable and travel with and form part of an endless conveyer one side of which acts as a continuous slide valve in conjunction with a steam or air chamber and this steam or air chamber is preferably formed in sections, formed with closed ends having inlets and outlets for the passage of the aforesaid continuous slide valve so that steam in increasing degrees of pressure may be admitted to the barrels. In this manner the barrels, when placed upon the conveyer at one end, are steamed or dried in course of transit to their destination at the other end of the conveyer, thus time and labor in the steaming or drying of barrels and the like are economized while the apparatus enables a large number of barrels to be efficiently and quickly dealt with.

The apparatus is also applicable to the washing and drying of bottles and jars.

In order that this invention may be fully understood, it will now be described with reference to the accompanying drawings, in which:—

Figure 1 is a plan of the apparatus the barrels being indicated in dotted lines. Fig. 2 is a side elevation of the apparatus. Fig. 3 is a cross section drawn to an enlarged scale. Fig. 4 is a plan, partially in section of Fig. 3. Fig. 5 is a cross section on line $x$, $x$ of Fig. 4, and Fig. 6 is an elevation of the steam or air chamber and traversing chain forming the continuous slide valve.

In carrying this invention into practical effect, the conveyer consists of three chains $a$, $b$, $c$ formed of links and carried at each end upon hexagonal wheels $d$, furnished with three teeth $d'$, the latter being mounted upon transverse shafts $e$ supported in pedestal bearings $f$ secured in a concrete foundation.

The two chains $a$, $b$ are designed to support the barrels $g$ while the third chain $c$ acts as a slide valve and passes through the side of the air or steam chamber $h$ between adjustable guide plates $h'$, the said chamber being preferably formed in sections, and provided with inlet pipes $i$ and to this slide valve member, transverse tubes $j$ are secured which are connected with the barrel supporting chains $a$, $b$ while each of the said transverse tubes has a right-angled upwardly extending pipe $k$ designed to enter the bung hole of the barrel, the said upwardly extending pipe being braced to the side chains as at $l$, (Figs. 1 and 5).

The conveyer is designed to be arranged over a concrete pit and to be partially inclosed for the purpose of enabling the outsides of the barrel being simultaneously dried, while the traveling chains $a$ and $b$, forming the conveyer, are supported in channeled irons $m$ carried on girders $n$ supported by transverse members $n'$, (Fig. 3). Any suitable means of rotating the conveyer may be employed. In practice, as the conveyer slowly rotates, barrels are placed thereon with the aforesaid upwardly extending pipes passing through the bung holes. As each pipe $k$ is connected with the transverse tube $j$ which in turn is connected with the third chain $c$ forming the slide valve passing through the steam or air chamber $h$, it will be seen that steam or air is passed into the barrels as the conveyer rotates.

What I claim as my invention and desire to secure by Letters Patent of the United States is:—

1. A steaming and drying apparatus as set forth characterized by an endless conveyer combining an endless slide valve, a steam or air chamber through which the slide valve passes and pipe connections from the slide valve for conveying steam or air to the article to be steamed or dried, substantially as and for the purposes described.

2. A steaming and drying apparatus as set forth characterized by an endless conveyer combining an endless slide valve, a steam or air chamber formed in sections through which the slide valve passes and pipe connections from the slide valve for conveying steam or air to the article to be steamed or dried, substantially as and for the purposes described.

3. An improved apparatus for steaming and drying barrels and the like comprising an endless conveyer formed of two chain-like members and a third linked member forming a continuous slide valve, the whole braced together and passing over wheels or drums at each end of the conveyer, a steam or air chamber through which the slide valve passes and transverse pipes connecting the slide valve with the conveyer chains and right-angled upwardly projecting pipes connected with the transverse pipes designed to enter and convey steam or air to the article to be steamed or dried, substantially as and for the purpose specified.

4. An improved apparatus for steaming and drying barrels and the like comprising three linked members braced together and forming a conveyer and endless slide valve, hexagonal toothed wheels for supporting the conveyer at each end, a steam or air chamber having a longitudinal opening against which the endless slide valve is held, adjustable guiding plates for holding the slide valve in position, transverse pipes having right-angled upwardly extending pipes for the passage of the steam or air and channeled irons for supporting the upper traveling surface of the conveyer; the whole constructed, arranged and operating substantially as herein described and shown with reference to the accompanying drawings.

In testimony whereof I affix my signature in presence of two witnesses.

WILLIAM ROBERT JEFFREYS.

Witnesses:
 WILLIAM SIMPSON,
 NELLIE AITKEN.

Copies of this patent may be obtained for five cents each, by addressing the "Commissioner of Patents, Washington, D. C."